United States Patent
Frank et al.

(10) Patent No.: US 11,149,664 B2
(45) Date of Patent: Oct. 19, 2021

(54) METHOD FOR MONITORING A CYLINDER PRESSURE SENSOR

(71) Applicant: MTU FRIEDRICHSHAFEN GMBH, Friedrichshafen (DE)

(72) Inventors: Tobias Frank, Friedrichshafen (DE); Aron Toth, Friedrichshafen (DE); Horst Weidele, Meersburg (DE)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 145 days.

(21) Appl. No.: 16/614,908

(22) PCT Filed: May 3, 2018

(86) PCT No.: PCT/EP2018/061247
§ 371 (c)(1),
(2) Date: Nov. 19, 2019

(87) PCT Pub. No.: WO2018/215181
PCT Pub. Date: Nov. 29, 2018

(65) Prior Publication Data
US 2020/0208578 A1 Jul. 2, 2020

(30) Foreign Application Priority Data
May 22, 2017 (DE) .................... 10 2017 004 895.9

(51) Int. Cl.
*F02D 35/02* (2006.01)
*F02D 41/22* (2006.01)
*G01L 23/22* (2006.01)
*F02D 41/00* (2006.01)
*G01L 27/00* (2006.01)

(52) U.S. Cl.
CPC .......... *F02D 35/024* (2013.01); *F02D 41/009* (2013.01); *F02D 41/222* (2013.01); *G01L 23/22* (2013.01); *G01L 27/007* (2013.01); *F02D 2200/024* (2013.01)

(58) Field of Classification Search
CPC .... F02D 35/024; F02D 41/009; F02D 41/222; F02D 2200/024; G01L 23/22; G01L 27/007
USPC .......................................................... 73/1.68
See application file for complete search history.

(56) References Cited

U.S. PATENT DOCUMENTS

| 3,183,708 A | 5/1965 | Roddick |
| 5,168,854 A | 12/1992 | Hashimoto |
| 2007/0277591 A1 | 12/2007 | Hoshi |

FOREIGN PATENT DOCUMENTS

| DE | 4127950 A1 | 3/1992 |
| WO | 2015050237 A1 | 4/2015 |

*Primary Examiner* — Mahmoud Gimie
(74) *Attorney, Agent, or Firm* — Lucas & Mercanti, LLP; Klaus P. Stoffel

(57) ABSTRACT

A method for monitoring a cylinder pressure sensor, in which method the sensor value is checked for admissibility and inadmissibility in a predefinable crankshaft angle range, when admissibility is detected the cylinder pressure sensor is used further and when inadmissibility is detected the cylinder pressure sensor is deactivated. A first sensor value of the cylinder pressure sensor is set as a start value, and a second sensor value is set as a stop value, a plateau range is determined from the number of sampling steps between the start value and the stop value, and the plateau range is set as decisive for the admissibility or inadmissibility of the sensor values.

8 Claims, 4 Drawing Sheets

METHOD FOR MONITORING A CYLINDER PRESSURE SENSOR

CROSS-REFERENCE TO RELATED APPLICATIONS

The present application is a 371 of International application PCT/EP2018/061247, filed May 3, 2018, which claims priority of DE 10 2017 004 895.9, flied May 22, 2017, the priority of these applications is hereby claimed and these applications are incorporated herein by reference.

BACKGROUND OF THE INVENTION

The invention relates to a method for monitoring a cylinder-pressure sensor, in which the sensor value is checked for admissibility and inadmissibility within a predeterminable crankshaft-angle range: with established admissibility the cylinder-pressure sensor continues to be used, and with established inadmissibility the cylinder-pressure sensor is deactivated.

In a cylinder-pressure-based engine management system the quality of the combustion is assessed on the basis of the measured cylinder pressure. A combustion control to the 50% conversion point (MFB50) has been established. The basis for this control—for example, an injection-start control—is therefore an operational cylinder-pressure sensor. However, the harsh environment and also the set mode of operation can bring about damage to the cylinder-pressure sensor. For instance, gas engines are operated at the knock limit, in order to attain an optimal efficiency. Depending upon the intensity of the knocking, in this case the measuring element of the cylinder-pressure sensor—that is to say, the membrane—may be irreversibly deformed or even destroyed. Depending upon the deformation, a pressure value that does not actually exist is therefore indicated. So long as the pressure in the cylinder is not higher than the output voltage of the pressure sensor—of 4.5 volts, for example—corresponding to the maximum of the range of measurement allows, the pressure in the cylinder can still be determined correctly.

However, higher pressure values in the cylinder are critical, since the cylinder-pressure sensor is then being operated in saturation—that is to say, the output voltage has then been limited to 4.5 volts and displays a plateau.

From US 2007/0277591 A1 a method for monitoring a cylinder-pressure sensor is known, in which the sensor signal is monitored for a zero-point error and a gain error within a predetermined crankshaft-angle range. If the sensor values do not lie within the admissible range of values, the sensor values are adapted where appropriate. The subsequent control processes—for example, the start of injection—are then based on the adapted sensor values. In the case of a zero-point error that is too great, the sensor values are adapted, and the driver is informed of the error by means of a warning lamp. In the case of a gain error that is too great, the cylinder-pressure sensor is deactivated, and a substitute value of the cylinder pressure is established for the subsequent control processes. In this connection it is critical that the cylinder-pressure sensor is already deactivated in the case of a temporary gain error.

SUMMARY OF THE INVENTION

The object underlying the invention is therefore to develop a method for monitoring the cylinder-pressure sensor with improved error detection in comparison with the described prior art.

The invention provides that a first sensor value is set as start-value and a second sensor value is set as stop-value, a plateau width is determined from the number of sampling steps between the start-value and the stop-value, and the plateau width is set as decisive for the admissibility or inadmissibility of the sensor values. For this purpose, in a first step the sensor value is compared with a saturation limit, sensor values greater than the saturation limit being assigned to a first range, and sensor values less than the saturation limit being assigned to a second range. Within the first range, the first sensor value that is greater than the saturation limit is set as start-value, and the last sensor value that is greater than the saturation limit is set as stop-value. Within the second range, the maximum of the second derivative of the sensor signal is set as start-value, and the minimum of the second derivative of the sensor signal is set as stop-value. In both cases the plateau width is subsequently determined, by the number of sampling steps being multiplied by the signal resolution. By "signal resolution" is to be understood the angular separation in degrees of two measured values relative to the crankshaft angle or the temporal spacing of two measured values—that is to say, the sampling time. The comparison of the plateau width with a previously defined limiting value establishes the further procedure, in that the cylinder-pressure sensor is marked as defective in the case of a plateau width that is too great.

In addition to the accurate detection of a previously damaged cylinder-pressure sensor and an active protection of the internal-combustion engine, a further advantage consists in the fact that the sensor signal is used for as long as possible.

If the sensor values lie below the saturation limit, they are used despite a gain error. In addition, the invention permits the installed cylinder-pressure sensors to be checked against one another for plausibility. In practice, the method presented is applicable both in a diesel engine, in a gas engine or even in a spark-ignition engine.

BRIEF DESCRIPTION OF THE DRAWING

A preferred embodiment example is represented in the figures. Shown are.

DETAILED DESCRIPTION OF THE INVENTION

Figure 1:
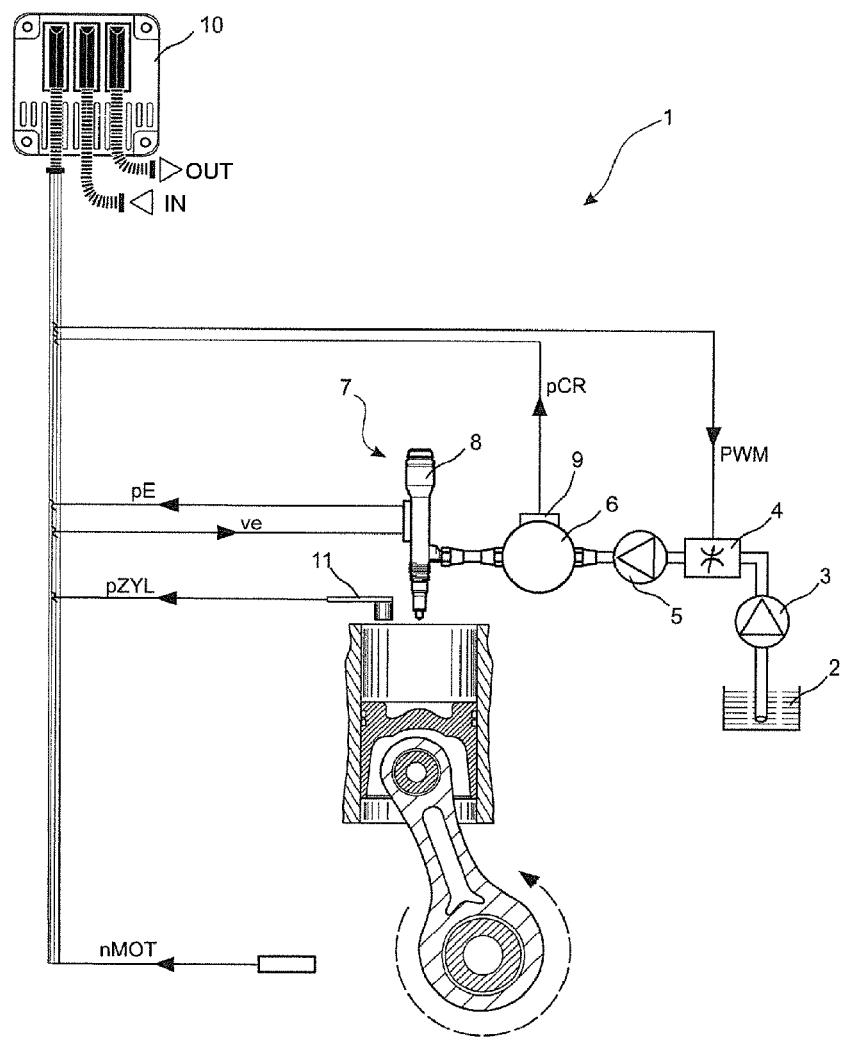
FIG. 1 a system graphic,
FIG. 2 a program flowchart,
FIG. 3 a diagram and
FIG. 4 a diagram

FIG. 1 shows a system graphic of an electronically controlled internal-combustion engine 1 with a common-rail system. The common-rail system comprises the following mechanical components: a low-pressure pump 3 for conveying fuel from a fuel tank 2, a variable suction throttle 4 for influencing the volumetric flow-rate of the fuel flowing through, a high-pressure pump 5 for conveying the fuel with increase of pressure, a rail 6 for storing the fuel, and injectors 7 for injecting the fuel into the combustion chambers of the internal-combustion engine 1. Optionally, the common-rail system may also have been realized with individual storage reservoirs, in which case, for example, an individual storage reservoir 8 has then been integrated within the injector 7 as an additional buffer volume.

The mode of operation of the internal-combustion engine 1 is determined by an electronic control unit 10. The electronic control unit 10 includes the conventional components of a microcomputer system, for instance a microprocessor, I/O modules, buffers and memory modules (EEPROM, RAM). In the memory modules the operating data relevant for the operation of the internal-combustion engine 1 have been applied in characteristic maps/curves or as engine models. Via these data, the electronic control unit 10 calculates the output variables from the input variables. In FIG. 1 the following input variables are represented by way of example: the rail pressure pCR, which is measured by means of a rail-pressure sensor 9, an engine speed nMOT, the cylinder pressure pZYL, which is measured by means of a cylinder-pressure sensor 11, optionally the pressure pE of the individual storage reservoir 8, and an input variable IN. The other sensor signals have been summarized under the input variable IN, for instance the charge-air pressure of an exhaust-driven supercharger. In FIG. 1 a signal PWM for triggering the suction throttle 4, a signal ve for triggering the injectors 7 (start/end of injection) and an output variable OUT are represented as output variables of the electronic control unit 10. The output variable OUT is representative of the other actuating signals for controlling and regulating the internal-combustion engine 1, for instance an actuating signal for activating a second exhaust-driven supercharger in the course of charging of a register. On the basis of the cylinder pressure pZYL, the electronic control unit 10 determines the combustion situation. The combustion situation is evaluated via the value MFB50, in the case of which one half of the injected quantity of fuel has been burned.

Figure 2:
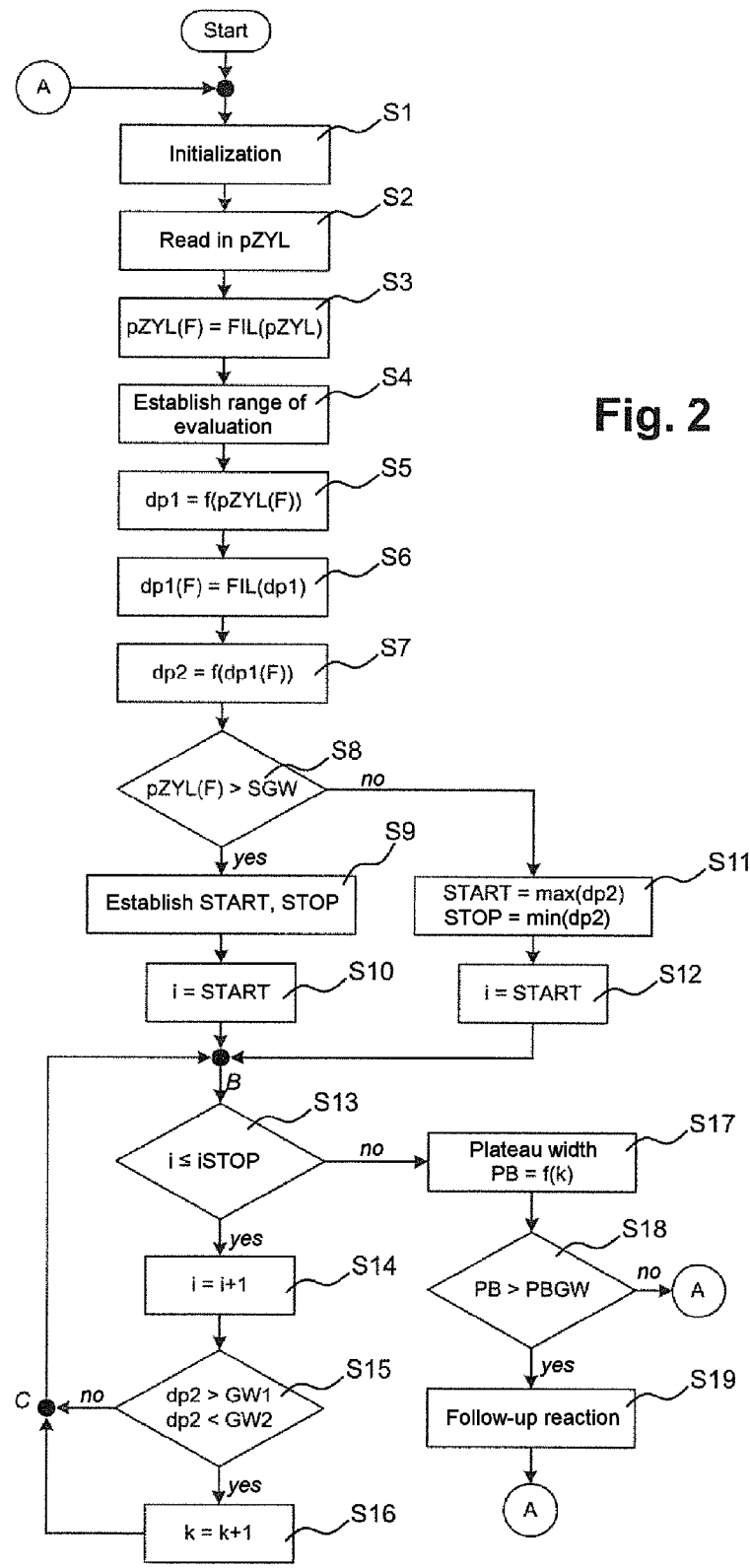

FIG. 2 shows a program flowchart in which the method is represented. The specified numerical values relate to a voltage sensor with a range of values from 0 V to 5 V and with a range of measurement from 0.5 V to 4.5 V. The method according to the invention can, of course, also be applied to voltage-output pressure sensors and current-output pressure sensors. After the start of the program, the values of the method are initialized at S1. Accordingly, a saturation limit is set to, for example, SGW=4.5 volts, a range of evaluation is established, and the corresponding counters are reset to zero. At S2, the cylinder pressure pZYL—that is to say, the voltage value of the cylinder-pressure sensor (FIG. 1: 11)—is then read in. In the error-free state, the cylinder-pressure sensor provides a voltage range from 0.5 volts to 4.5 volts. At S3, the cylinder pressure pZYL is filtered by means of formation of moving averages. In FIG. 2 the output variable is identified by pZYL(F). Subsequently at S4 a range of evaluation of the crankshaft angle is established, for example PHI=±180°. The checking of the cylinder-pressure sensor takes place within this crankshaft-angle range. At S5, the first derivative dp1 of the filtered cylinder pressure pZYL(F) is then calculated. The first derivative dp1 may be with respect to the crankshaft angle (pZYL(F)/dPHI) or with respect to time (pZYL(F)/dt). At S6, the first derivative dp1 is then filtered by formation of moving averages; output variable: dp1(F). At S7, in turn, the second derivative dp2 is calculated from the output variable dp1(F). After this, at S8 the program checks whether the filtered cylinder pressure pZYL(F) is greater than the saturation limit SGW. In the event of a positive query outcome, S8: yes, said pressure is assigned to a first range, and the method proceeds in accordance with steps S9 and S10. In the event of a negative query outcome, S8: no, the filtered cylinder pressure pZYL(F) is assigned to a second range, and the method proceeds in accordance with steps S11 and S12. A more detailed description relating to this is given in connection with FIGS. 3 and 4.

If it was detected at S8 that the sensor value—here: the filtered cylinder pressure pZYL(F)—is less than the saturation limit SGW, the start-value START and the stop-value STOP are set at S11. The start-value START is the maximum value of the second derivative dp2, and the stop-value STOP is the minimum value of the second derivative dp2. In FIG. 3B, for instance, the start-value START is defined by dp2=0.023 a.u. and by sampling step 1865. Correspondingly, the stop-value STOP is defined by dp2=−0.013 a.u. and by sampling step 1885. The abbreviation a.u. stands for "arbitrary unit"—in this case, for the second derivative of the voltage unit (volt) over the crank angle PHI (degrees). As an equivalent, the time may also be used instead of the crankshaft angle. At S12, an index variable i is then set to the sampling step of the start-value—that is to say, i=1865. After this, the program flowchart is continued at point B.

If it was detected at S8 that the filtered cylinder pressure pZYL(F) is greater than the saturation limit SGW, the start-value START and the stop-value STOP are set at S9. The start-value START corresponds to the first sensor value that is greater than the saturation limit SGW. The stop-value STOP corresponds to the last sensor value that is greater than the saturation limit SGW. The start-value START is defined by a voltage value and by the sampling step pertaining to said voltage value. For instance, in FIG. 4B, after calculation of the second derivative, the start-value START is defined by dp2=−0.015 a.u. and by sampling step 1760, and the stop-value STOP is defined by dp2=−0.007 a.u. and by sampling step 2030. At S10, index variable i is then set to the sampling step of the start-value—that is to say, i=1760. After this, the program flowchart is continued at point B.

At S13, the program checks whether index variable i is less than or equal to the sampling step iSTOP corresponding to the stop-value STOP. If this is the case, query outcome S13: yes, then index variable i is increased by one at S14, and at S15 the program checks whether the second derivative dp2 lies within a range of evaluation. In FIGS. 3B and 4B the range of evaluation is identified by reference symbol AW. The range of evaluation is defined by the two limiting values GW1 and GW2. The two limiting values GW1 and GW2 have been chosen in such a way that they lie above and below, respectively, the signal-noise band but the signals for start and stop lie outside these limiting values. If the second derivative dp2 lies within the range of evaluation AW, query outcome S15: yes, then at S16 an index variable k is increased by one. Index variable k stands for the number of sampling steps within the range of evaluation. After this, the program flowchart is continued at point C and then at point B. If it is established at S15 that the second derivative dp2 lies outside the range of evaluation AW, the program flowchart is continued at point C and then at point B.

If the check at S13 shows that index variable i is greater than iSTOP, the plateau width PB is determined at S17. For this purpose, the value index variable k is multiplied by the signal resolution, for example 0.1 degree crankshaft angle. After this, at S18 the program checks whether the plateau width PB is greater than a limiting value PBGW. The limiting value PBGW is a measure, starting from which, when it is exceeded, the cylinder-pressure sensor is marked as defective. If the plateau width PB is less than the limiting value PBGW, query outcome S18: no, the cylinder-pressure sensor is marked as functional, and the program flowchart is continued at point A with step S1. If it is detected at S18 that the plateau width PB is greater than the limiting value PBGW, query outcome S18: yes, then the cylinder-pressure sensor is marked as defective, and a follow-up reaction is initiated at S19. By way of follow-up reaction there is provision, for example, that a reduction in power is induced for the internal-combustion engine, the cylinder pressure of a pressure sensor working in error-free manner is used as basis for the control and regulation, or in the simplest case the sensor value of the defective cylinder-pressure sensor is set to a substitute value. After this, the program flowchart is continued at point A.

The program flowchart of FIG. 2 includes with steps S2 to S7 a conditioning of the measurement signal as maximum scope of the invention. In a simpler version of the invention, these steps may be omitted, so that, for example, at step S8 the sensed cylinder pressure pZYL is used as sensor value instead of the filtered cylinder pressure pZYL(F). Similarly, in the evaluation of the plateau width the focus is then not on the second derivative but on the sensor values. This simpler embodiment permits a faster process cycle. However, the use of the second derivative and the signal conditioning offer the advantage, in contrast, that the capture of a limiting value, starting from which a cylinder-pressure sensor is recognized to be defective, and also the determination of START and STOP for the purpose of delimiting the defect check, can be mathematically determined more reliably.

Figure 3A:
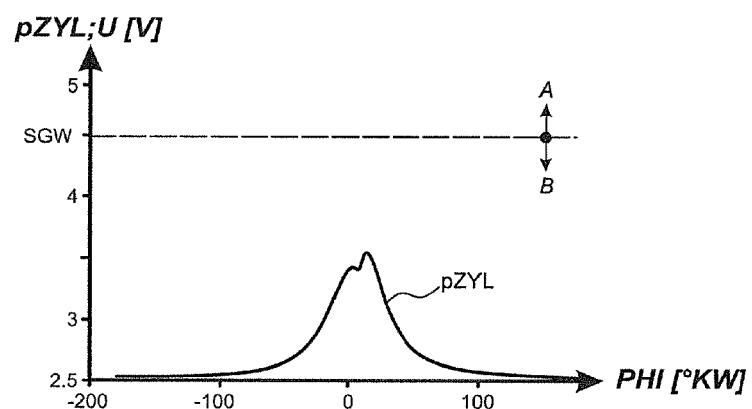
Figure 3B:
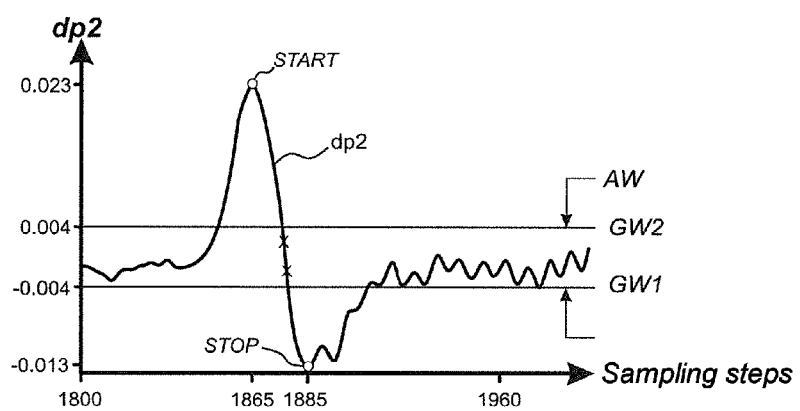

In FIG. 3 an example of a cylinder-pressure progression within the second range is represented. FIG. 3 consists of FIGS. 3A and 3B. In this connection, FIG. 3A shows the progression of the cylinder pressure pZYL or, to be more exact, the voltage progression U, corresponding thereto, in volts of the cylinder-pressure sensor over the crankshaft angle PHI in degrees crankshaft. FIG. 3B shows the progression of the second derivative dp2 of the sensor signal over the sampling steps.

According to the representation in FIG. 3A, within the crankshaft-angle range being considered the maximum value of the cylinder pressure pZYL or, to be more exact, the corresponding voltage value U lies below the saturation limit of, for example, SGW=4.7 V. Hence the signal progression lies within a second range B. A sampling step pertains to each voltage value. In FIG. 3B a range from the 1800th sampling step to the 1960th sampling step has been plotted on the abscissa. The method now provides that the maximum value of the second derivative dp2 is set as start-value START. In FIG. 3B this value has been identified correspondingly as START. The minimum value of the second derivative dp2 has been identified as STOP. For instance, the start-value START has been identified by dp2=0.023 a.u. and by sampling step 1865. The abbreviation a.u. stands for "arbitrary unit"—in this case, for the second derivative of the voltage unit (volt) with respect to crank angle Phi (degrees). As an equivalent, the time may also be used instead of the crankshaft angle. The stop-value STOP is defined by dp2=−0.013 a.u. and by sampling step 1885. In addition, in FIG. 3B the range of evaluation AW has been drawn in, which is defined by the first limiting value GW1=−0.004 a.u. and by the second limiting value GW2=0.004 a.u. The sampling steps that lie within the range of evaluation AW are now counted. In FIG. 3B two sampling steps have been drawn in by way of example. Subsequently, on the basis of the number of sampling steps and the signal resolution, for example 0.1 degree crankshaft angle, the plateau width PB is calculated, and the program checks whether this width is greater than a limiting value (FIG. 2: PBGW). For the example represented, the plateau width is less than the limiting value, so the cylinder-pressure sensor is marked as error-free.

Figure 4A:
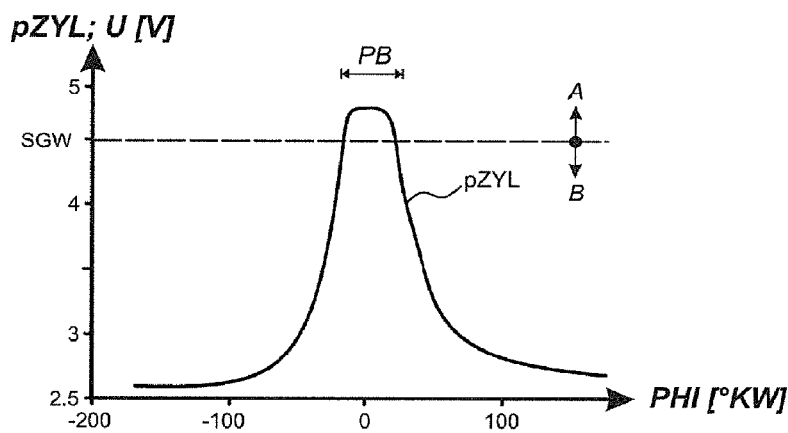
Figure 4B:
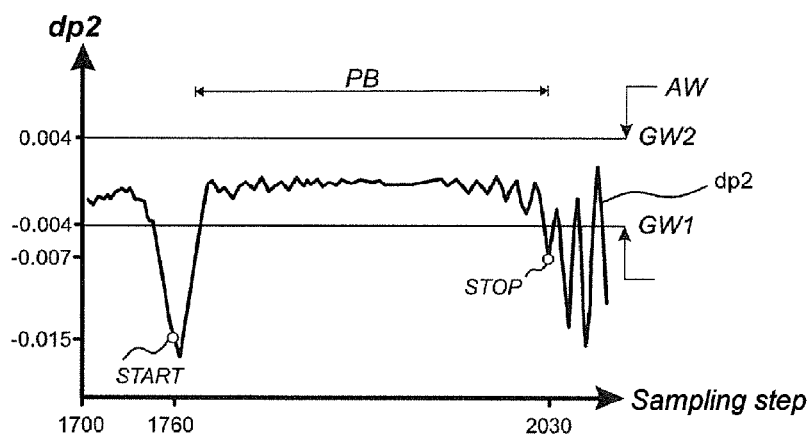

In FIG. 4 an example of a cylinder-pressure progression within the first range A is represented. FIG. 4 consists of FIGS. 4A and 4B. In this connection, FIG. 4A shows the progression of the cylinder pressure pZYL or, to be more exact, the voltage progression U, corresponding thereto, in volts of the cylinder-pressure sensor over the crankshaft angle PHI in degrees crankshaft. FIG. 4B shows the progression of the second derivative dp2 of the sensor signal over the sampling steps.

As represented in FIG. 4A, the voltage-level U of the cylinder-pressure sensor lies above the saturation limit SGW—that is to say, the cylinder-pressure sensor is being operated in saturation. The voltage progression U therefore displays a plateau PB. A possible cause of this may be an irreversible deformation of the membrane of the cylinder-pressure sensor and a correspondingly high cylinder pressure such as arises, for example, at full load. Further possible causes may be both that the cylinder is being operated at excessive pressures and the sensor cannot fully capture the range of measurement, and a knocking combustion. As already elucidated in the program sequence of FIG. 2, the first actual sensor value that has a greater magnitude than the saturation limit SGW is set as start-value START. The last actual sensor value that has a greater magnitude than the saturation limit SGW is set as stop-value STOP. In FIG. 4B the start-value START and the stop-value STOP have been identified correspondingly. The start-value START is defined by dp2=−0.015 a.u. and by sampling step 1760. The stop-value STOP is defined by dp2=−0.007 a.u. and by sampling step 2030.

The invention now provides that the number of sampling steps is ascertained in which the second derivative dp2 lies within the range of evaluation AW. The range of evaluation is defined by the two limiting values GW1 and GW2. Accordingly, in FIG. 4B this is the range from the 1760th sampling step to the 2030th sampling step.

Subsequent to this, the plateau width PB is determined by the number of sampling steps being multiplied by the signal resolution, for example, 0.1 degree crankshaft angle. After this, the program checks whether the plateau width PB is greater than the limiting value PBGW. In the example represented in FIG. 4B, an excessive plateau width was detected, so a corresponding follow-up reaction is initiated, for example a reduction in power of the internal-combustion engine.

REFERENCE SYMBOLS 1 internal-combustion engine
2 fuel tank
3 low-pressure pump
4 suction throttle
5 high-pressure pump
6 rail
7 injector
8 individual storage reservoir
9 rail-pressure sensor
10 electronic control unit
11 cylinder-pressure sensor

The invention claimed is:

1. A method for monitoring a cylinder-pressure sensor, comprising the steps of: checking a sensor value for admissibility and inadmissibility within a predeterminable crankshaft-angle range; continuing to use the cylinder-pressure sensor when admissibility is detected; and deactivating the cylinder-pressure sensor when inadmissibility is detected; wherein the method includes setting a first sensor value of the cylinder-pressure sensor as a start-value; setting a second sensor value as a stop-value; determining a plateau width from a number of sampling steps between the start-value and the stop-value; and setting the plateau width as decisive for the admissibility or inadmissibility of the sensor values.

2. The method according to claim 1, including comparing the sensor value with a saturation limit, wherein sensor values greater than the saturation limit are assigned to a first range, and sensor values less than the saturation limit are assigned to a second range.

3. The method according to claim 2, wherein within the first range a first sensor value greater than the saturation limit is set as the start-value, and a last sensor value greater than the saturation limit is set as the stop-value.

4. The method according to claim 2, wherein within the second range a maximum of a second derivative of the sensor signal is set as the start-value, and a minimum of the second derivative of the sensor signal is set as the stop-value.

5. The method according to claim 3, including calculating the plateau width by multiplying the number of sampling steps by signal resolution in the sense of a crankshaft angle or a sampling time.

6. The method according to claim 5, including exclusively taking into consideration sensor values within a range of evaluation in determining the plateau width.

7. The method according to claim 6, including marking the cylinder-pressure sensor as defective when the plateau width is greater than a limiting value.

8. The method according to claim 7, including initialing a follow-up control, during which the sensor value is set to a substitute value, a reduced-power operation of the internal-combustion engine is predetermined, the sensor value is set to the sensor value of a sound cylinder-pressure sensor, or an engine stop is output.

\* \* \* \* \*